United States Patent [19]

Takeuchi et al.

[11] Patent Number: 5,265,709
[45] Date of Patent: Nov. 30, 1993

[54] PULL-TYPE CLUTCH COVER ASSEMBLY

[75] Inventors: Hiroshi Takeuchi; Hiroshi Uehara, both of Neyagawa, Japan

[73] Assignee: Kabushiki Kaisha Daikin Seisakusho, Neyagawa, Japan

[21] Appl. No.: 849,041

[22] PCT Filed: Sep. 20, 1991

[86] PCT No.: PCT/JP91/01260
§ 371 Date: Apr. 24, 1992
§ 102(e) Date: Apr. 24, 1992

[87] PCT Pub. No.: WO92/06312
PCT Pub. Date: Apr. 16, 1992

[30] Foreign Application Priority Data

Sep. 28, 1990 [JP] Japan ................. 2-103025[U]

[51] Int. Cl.$^5$ .................................................. F16D 13/71
[52] U.S. Cl. .................................. 192/89 B; 192/70.27
[58] Field of Search ............ 192/70.27, 89 B, 109 A, 192/109 B, 89 PL

[56] References Cited

U.S. PATENT DOCUMENTS

| 3,811,544 | 5/1974 | Maucher | 192/89 B |
| 4,602,708 | 7/1986 | Nagano | 192/70.27 |
| 4,641,736 | 2/1987 | Förster | 192/89 B |
| 4,949,829 | 8/1990 | Tojima et al. | 192/89 B |
| 5,022,508 | 6/1991 | Fukuda | 192/70.27 |
| 5,088,583 | 2/1992 | Takeuchi et al. | 192/70.27 |
| 5,088,584 | 2/1992 | Inaba et al. | 192/89 B |
| 5,148,904 | 9/1992 | Takashi et al. | 192/89 B |

FOREIGN PATENT DOCUMENTS

| 1-96532 | 6/1989 | Japan . |
| 2-36629 | 9/1990 | Japan . |
| 2-136819 | 11/1990 | Japan . |

*Primary Examiner*—Richard M. Lorence
*Attorney, Agent, or Firm*—Armstrong, Westerman, Hattori, McLeland & Naughton

[57] ABSTRACT

In a pull-type clutch, a holder (10) is installed in an inner face of a clutch cover (4), which includes a diaphragm spring support supporting an outside fulcrum point (C1) of a diaphragm spring (5) and a coned spring support supporting an outer peripheral edge of a disc-like annular coned spring (8). The diaphragm spring (5) and the coned spring (8) are supported by the holder (10). By this structure, a load of the diaphragm spring (5) can be prevented from increasing more than necessary in the midway of use of clutch, and the coned spring (8) provided therefor can be assembled easily.

3 Claims, 2 Drawing Sheets

PULL-TYPE CLUTCH COVER ASSEMBLY

DESCRIPTION

1. Technical Field

This invention relates to a pull-type clutch cover assembly equipped with a coned spring for preventing a load of diaphragm spring from increasing more than necessary in the midway of clutch movement.

2. Background Art

FIG. 6 is a schematic vertical sectional partial view showing a well known pull-type clutch cover assembly. A friction facing 2 is secured to an outer periphery of a clutch disc (not shown), and the friction facing 2 is designed to be pressed onto a flywheel 1 by means of a pressure plate 3. An outer periphery and backside face of the pressure plate 3 is covered by a clutch cover 4.

The clutch cover 4 is secured at its outer peripheral part to the flywheel 1 by screws 7. The pressure plate 3 is coupled at its outer peripheral part to an inside face of the clutch cover 4 by a strap plate (not shown) extending in circumferential direction, so that the pressure plate 3 is carried relative to the clutch cover 4 not rotatably but freely movably in axial direction.

A disc-like annular diaphragm spring 5 is disposed between the clutch cover 4 and the pressure plate 3. The diaphragm spring 5 is supported at its outside fulcrum point C1, by a corner 4a of the clutch cover 4, brought into contact, at its intermediate fulcrum point C2, with a fulcrum land 3a of the pressure plate 3 and supported, at its inside fulcrum point C3, by a release bearing 6. When the facing 2 is pressed onto the flywheel 1 by the pressure plate 3, in turn pushed by the diaphragm spring 5, the clutch is engaged.

When the release bearing 6 is moved axially away from pressure plate 3, an inner peripheral part of the diaphragm spring 5 is moved around the outside fulcrum point C1 and the pressure plate 3 is moved away from facing 2 by an elastic force of the strap plate, so that the clutch is disengaged.

The diaphragm spring 5, generally, has such a characteristic that its load changes relative to its deflection as diagrammed by a solid line A of FIG. 3. Ordinarily, a deflection in clutch engaged condition, at initial stage of use, is set to a value of point B. However, when the facing 2 is worn after a long period of use and, as the result the deflection of the diaphragm spring 5, in clutch engaged condition, is decreased, the load increases gradually to cause the deflection to reach a point C. When the facing 2 is further worn, the load decreases gradually to cause the deflection to reach a wear limit point D. As described above, there have been possibilities that the load (pressing force) of the diaphragm spring 5 would increase more than necessary in the midway of use of clutch especially in the vicinity of the point C, an excessive torque would be transmitted from the drive-side flywheel 1 to the driven-side clutch disc (not shown), and the required force to be applied to the clutch pedal would be increased.

DISCLOSURE OF THE INVENTION

An object of the invention is to prevent a load of diaphragm spring, in a pull-type clutch, from increasing, more than necessary, in the midway of clutch, operation and to simplify assembling work of a coned disc spring installed for that purpose.

In a pull-type clutch, wherein a radial outside fulcrum point of a diaphragm spring is supported by an inner face side of a clutch cover, an intermediate fulcrum point is brought into contact with a fulcrum land of a pressure plate, an inside fulcrum point is carried by a release bearing, and the release bearing is moved axially away from the pressure plate so as to disengage a clutch; there is provided a pull-type clutch cover assembly, in which a holder, having a diaphragm spring support supporting the outside fulcrum point of the diaphragm spring and a coned spring support supporting an outer peripheral edge of a disc-like annular coned spring, is installed on an inner face of the clutch cover, the outside fulcrum point of the diaphragm spring is supported by the diaphragm spring support of the holder, the coned spring is so installed that its outer peripheral edge is supported by the coned spring support of the holder and its inner peripheral edge is made contact from the pressure plate side with a radial external portion of the intermediate fulcrum point of the diaphragm spring when the clutch is engaged, and the diaphragm spring is urged by the coned spring to a side opposite to the pressure plate when the clutch is engaged.

In the present invention, when the deflection of the diaphragm spring is decreased, due to wear of the friction facing, at the time of clutch engagement, the coned spring is compressed in the axial direction to urge the diaphragm spring to the side opposite to the pressure plate so that the increase in load transmitted from the diaphragm spring to the pressured plate is controlled. Further, since the holder is installed, the coned spring can be assembled easily.

BEST MODE FOR CARRYING OUT THE INVENTION

Figure 1:
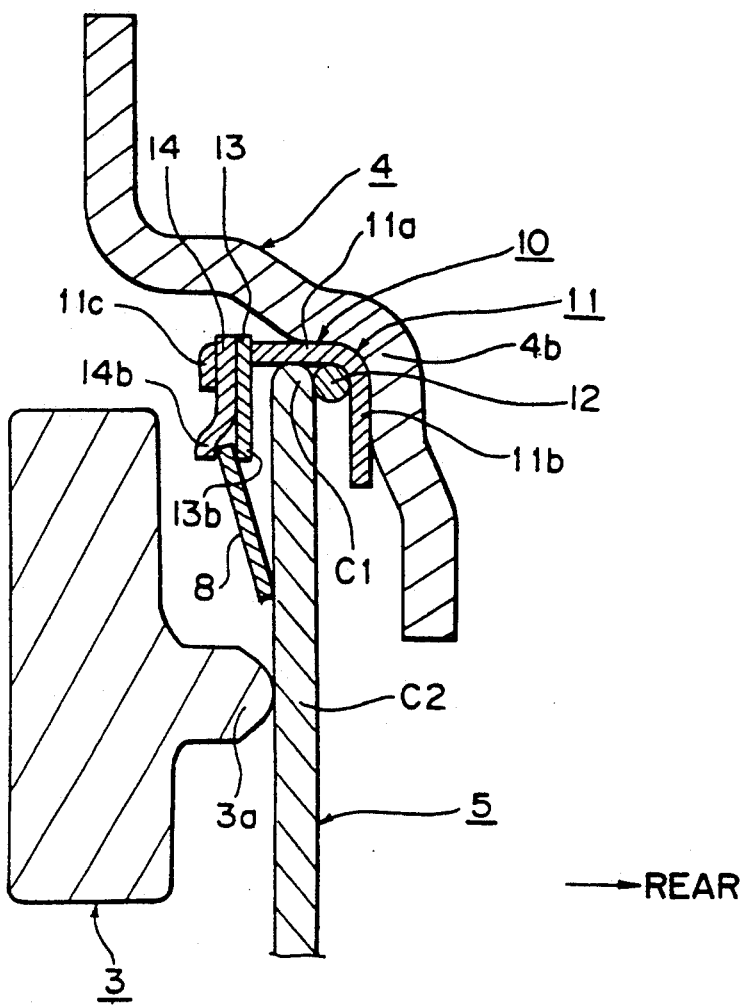
FIG. 1 is a schematic vertical sectional partial view showing a pull-type clutch cover assembly according to this invention.
Figure 2:
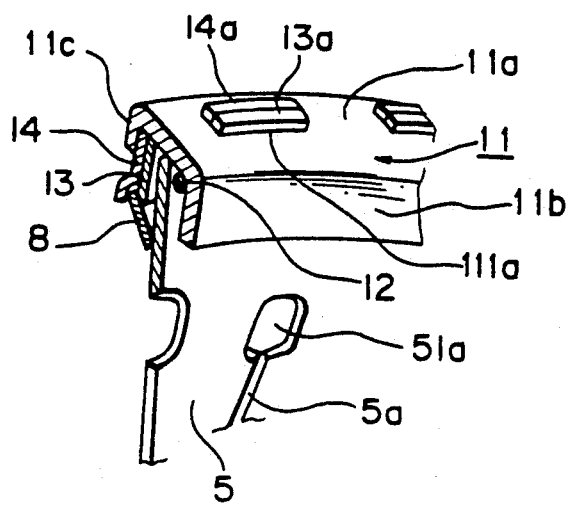
FIG. 2 is a oblique sectional view showing a holder used in an example of FIG. 1.
Figure 6:
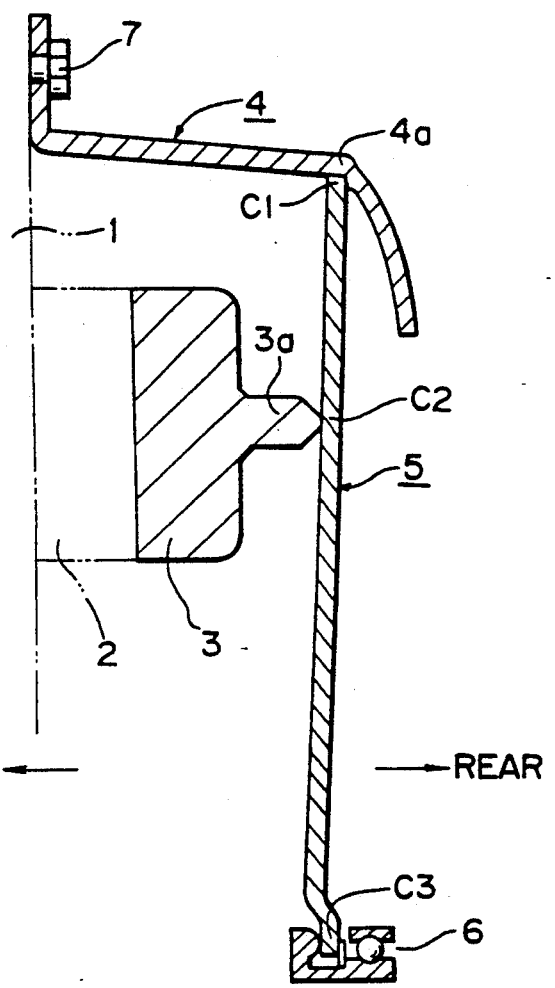
FIG. 6 is a schematic vertical sectional partial view showing a conventional pull-type clutch cover assembly.

An embodiment of this invention will be described hereunder with reference to the drawings. FIG. 1 is a schematic, vertical sectional, partial view showing the pull-type clutch cover assembly according to this invention. Components and points corresponding to those of FIG. 6 are attached with corresponding symbols. 8 denotes a coned spring, and 10 denotes a holder. FIG. 2 is the oblique sectional view of the holder 10.

The holder 10 consists of a body 11, a wire ring 12 and holding plates 13 and 14. The body 11 is formed into an inwardly-opened annular shape having a rough U-section, and consists of a central portion 11a, a long bent portion 11b and a short bent portion 11c. The wire ring 12 is fit to a corner formed by the central portion 11a and the long bent portion 11b so as to compose a diaphragm spring support. The holding plates 13 and 14 are disc-like annular body and installed on the short bent portion 11c placed upon another form inside. Plural convex portions 13a and 14a (FIG. 2) are formed on outer peripheral edges of the holding plates 13 and 14 with proper distances left between them, and the convex portions 13a and 14a are fit in holes 111a made on the central portion 11a so that the holding plates 13 and 14 are positioned relative to the body 11 so as not to be rotatable thereto. An inner peripheral edge 14b of the holding plate 14 is bent so as to create a clearance between it and an inner peripheral edge 13b of the holding plate 13. A coned spring support is thus formed by the holding plates 13 and 14. The holder 10 is so installed that the corner formed by the central portion 11a and the long bent portion 11b is bit to a corner 4b of the clutch cover 4 from the inside.

The outside fulcrum point C1 of the diaphragm spring 5 is so supported as to become contact with the wire ring 12 from the pressure plate 3 side. 5a (FIG. 2) denotes a slit formed on the diaphragm spring 5. The slit 5a is formed in radial direction from an inner peripheral edge of the diaphragm spring 5 to its intermediate portion, and an expanded portion 51a is formed at its end.

The coned spring 8 is a disc-like annular body and disposed in a space which is created between the pressure plate 3 and the diaphragm spring 5 in an axial direction and between the clutch cover 4 and the fulcrum land 3a in a radial direction. The coned spring 8 is so installed that is outer peripheral edge is inserted in and supported by a clearance between the inner peripheral edge 14b of the holding plate 14 and the inner peripheral edge 13b of the holding plate 13, and its inner peripheral edge is made contact from the pressure plate 3 side with a radial external portion of the intermediate fulcrum point C2 of the diaphragm spring 5 when the clutch is engaged, and the diaphragm spring 5 is urged to a side opposite to the pressure plate 3 when the clutch is engaged.

Figure 3:
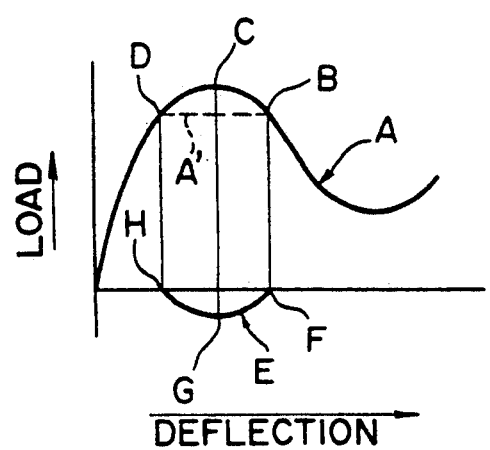
FIG. 3 is a diagram showing deflection-load characteristics of a diaphragm spring and a coned spring.

The coned spring 8 is so designed that its urging load onto the diaphragm spring 5 is changed according to a change in deflection of the diaphragm sprint 5, as shown by a solid line E of FIG. 3. In FIG. 3, an arrow mark attached to the axis of ordinate indicates a direction of increase in the deflection of the diaphragm spring 5, and a direction of decrease in the deflection of the coned spring 8.

In the pull-type clutch cover assembly thus constructed, when the deflection of the diaphragm spring 5 decreases to cause the load to increase from the point B to the point C and to decrease from the point C to the point D due to the wear of the facing 2 under the clutch engaged state, the inner peripheral part of the diaphragm spring 5 is moved around the outside fulcrum point C1 toward the pressure plate 3 side so that the coned spring 8 is compressed in the axial direction. The deflection of the coned spring 8 increases to cause its load to change in a direction opposite to the load of the diaphragm spring 5 (negative direction), i.e. to increase from a point F to a point G and decrease from the point G to a point H. Therefore, load changes of the diaphragm spring 5 and the coned spring 8 cancel each other and the load (pressing force) change of the diaphragm spring 5 onto the pressure plate 3 shifts from a solid line A to a broken line A', so that the occurrence of excessive pressing force in the midway of use of clutch can be eliminated substantially.

Because the diaphragm spring support and the coned spring support can be constructed by only installing the holder 10, the trouble of forming the corner 4a of the clutch cover 4 as encountered in conventional clutches can be avoided and the coned spring 8 can be assembled easily.

According to the present invention, as described above, the coned spring 8 is so installed as to urge the diaphragm spring 5 to the side opposite to the pressure plate 3 at the time of clutch engagement, in a pull-type clutch so that the load of diaphragm spring can be prevented from increasing more than necessary in the midway of clutch operation and the required force to be applied to the clutch pedal can be prevented from increasing.

Further, the holder 10 including the diaphragm spring support 12 and the coned spring support holding plates 13 and 14, is enstalled in the clutch, so that the trouble of forming the corner 4a of the clutch cover 4 as encountered in conventional clutches is avoided and the coned spring 8 can be easily assembled.

Figure 4:
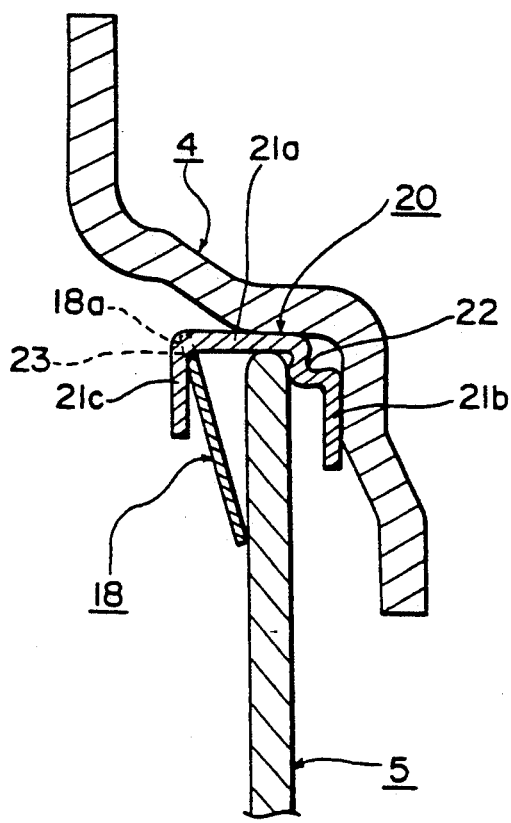
FIG. 4 is a schematic vertical sectional partial view showing a pull-type clutch cover assembly using a holder of another embodiment of the invention.
Figure 5:
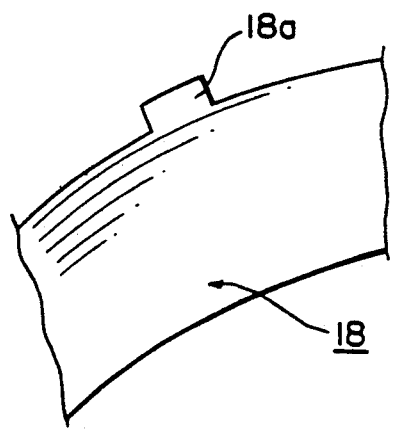
FIG. 5 is a view showing a coned spring used in an example of FIG. 4.

FIG. 4 illustrates another example of the holder. This holder 20 is formed into an inwardly-opened annular shape having a general U-section, and consists of a central portion 21a, a relatively long bent portion 21b and a relatively short bent portion 21c. The diaphragm spring support is composed of a convex portion 22 made by inwardly projectingly curving a corner formed by the central portion 21a and the long bent portion 21b, and the coned spring support is composed of holes 23 formed on a corner formed by the central portion 21a and the short bent portion 21c with proper distances left therebetween in the circumferential direction. When the holder 20 is used, a coned spring 18, as illustrated in FIG. 5, must be used. The coned spring 18 is designed to have a convex portion 18a formed on its outer peripheral edge, and to be supported by the holder 20 by fitting the convex portion 18a in the hole 23 of the holder 20.

What is claimed is:

1. In a pull-type clutch wherein a radial outside fulcrum point of a diaphragm spring is supported by an inner face side of a clutch cover, and intermediate fulcrum point is brought into contact with a fulcrum land of a pressure plate, an inside fulcrum point is carried by a release bearing, and the release bearing is moved axially away from the pressure plate so as to disengage a clutch; a pull-type clutch cover assembly having a roughly U-shaped annular holder mounted on an inner face of said clutch cover with said U-shaped facing inwardly toward said release bearing, said holder having a diaphragm spring support supporting said outside fulcrum point of said diaphragm spring and having a coned spring support extending axially inwardly from said clutch cover toward said pressure plate and supporting an outer peripheral edge of a disc-like annular coned spring, said coned spring being supported at its outer peripheral edge by said coned spring support and an inner peripheral edge of said coned spring contacting a pressure plate side of said diaphragm spring in a radial external portion of said diaphragm spring intermediate said outside fulcrum point and said intermediate point of said diaphragm spring when said clutch is engaged, and said diaphragm spring is urged by said coned spring in a direction away from said pressure plate when said clutch is engaged.

2. A pull-type clutch cover assembly as set forth in claim 1, in which said holder is composed of a body having a wire ring and two disc-like annular holding plates, an outer face of said holder is in contact with an inner face of said clutch cover, said diaphragm spring support consists of said wire ring fitted in a corner portion of said U-shaped, shaped, annular member at a side axially opposite to said pressure plate at the inner face of said body, convex portions on an outer peripheral edge at an axial pressure plate side of said body inner face and fitted into holes on said body so that side holding plates are position so as not to be rotatable relative to said body, and a clearance formed between inner peripheral part of said two holding plates for supporting said coned spring at said outer peripheral edge of said coned spring.

3. A pull-type clutch cover assembly as set forth in claim 1, in which said diaphragm spring support is composed of a convex portion formed by inwardly projectingly curving a corner of said holder at a side axially opposite to said pressure plate, and said coned spring support is composed of holes formed on a corner of said holder at an axial pressure plate side of said holder with proper distance left between said holes in the circumferential direction of said holder.

* * * * *